June 26, 1934. R. A. MELSHEIMER 1,964,526
TESTING SYSTEM AND APPARATUS THEREFOR
Filed March 31, 1933 6 Sheets-Sheet 1

INVENTOR
R. A. MELSHEIMER
BY
E. R. Nowlan
ATTORNEY

INVENTOR
R. A. MELSHEIMER
BY
E. R. Nowlan
ATTORNEY

June 26, 1934.  R. A. MELSHEIMER  1,964,526
TESTING SYSTEM AND APPARATUS THEREFOR
Filed March 31, 1933   6 Sheets-Sheet 5

INVENTOR
R. A. MELSHEIMER
BY
E. R. Nowlan
ATTORNEY

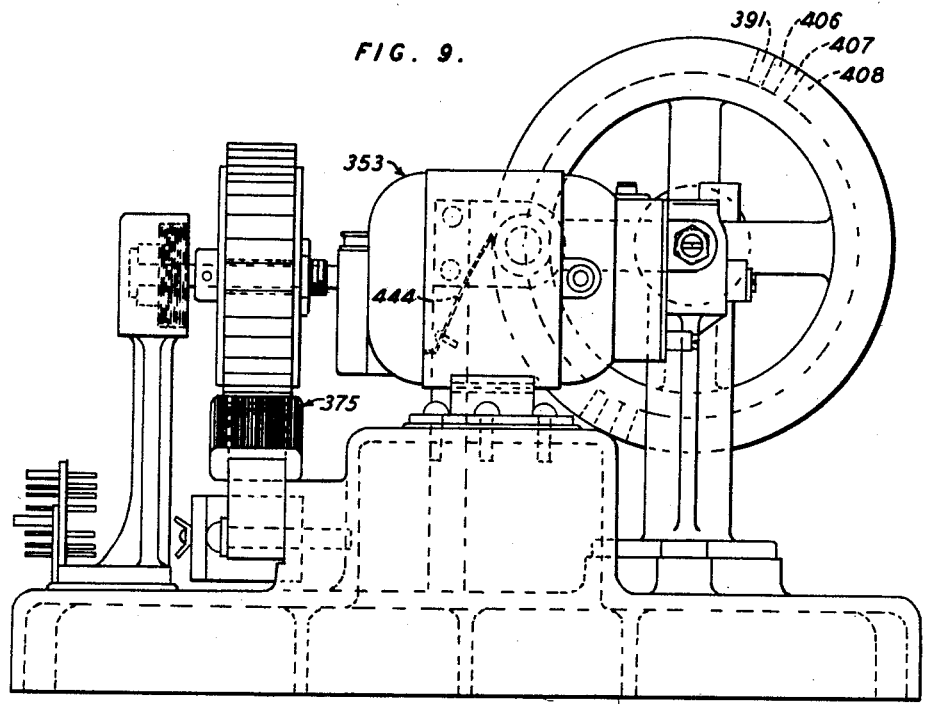
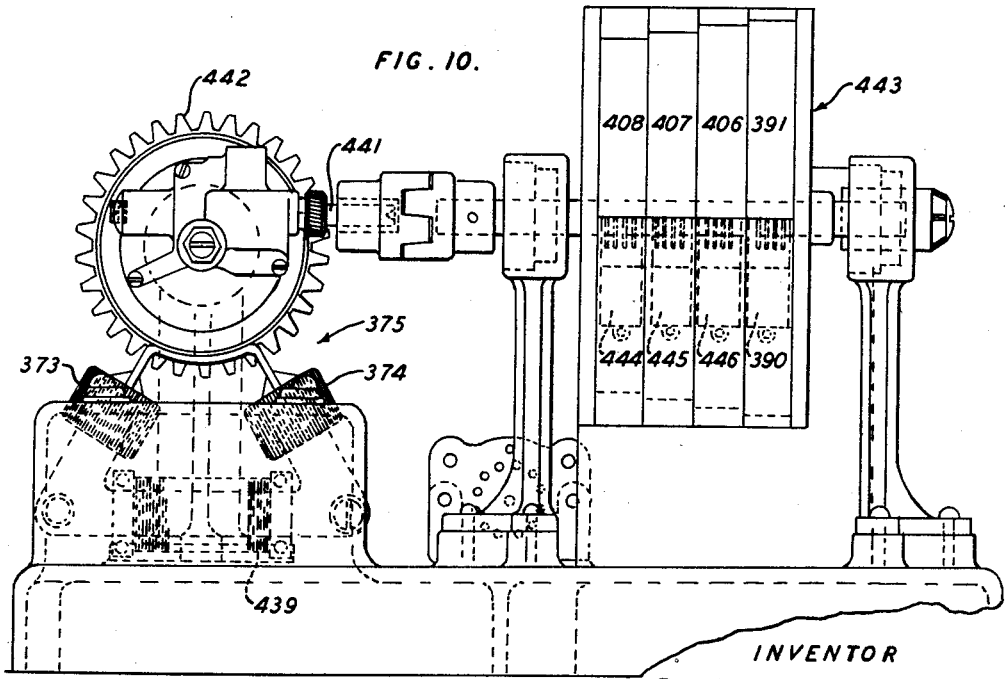

Patented June 26, 1934

1,964,526

UNITED STATES PATENT OFFICE 1,964,526

TESTING SYSTEM AND APPARATUS THEREFOR

Robert A. Melsheimer, Rutherford, N. J., assignor to Western Electric Company, Incorporated, New York, N. Y., a corporation of New York Application March 31, 1933, Serial No. 663,684

13 Claims. (Cl. 179—175.2)

The invention relates to a testing system and apparatus therefor, and more particularly to a system and apparatus for testing the adjustment of impulse transmitting devices such as dials for automatic testing systems.

Objects of the invention are to provide a system and apparatus for accurately and efficiently making all of the tests to which an impulse device is subjected to determine its proper adjustment.

In accordance with a preferred embodiment of the invention, a plurality of condensers are provided, some of which are charged at different rates from the others and the duration of the charges are controlled by selector switches. In the speed test, at the termination of the charging period, each of the condensers is connected across a galvanometer and simultaneously therewith a predetermined voltage is impressed across the condensers in a direction opposite to that of the voltage first applied. In the percent break test, which measures the ratio between the impulses and intervening intervals, two condensers are charged on the closed portions of the pulse and two other condensers on the open portions of the pulse and the condensers are then automatically connected to the galvanometers with their polarities opposing. In addition to these features, apparatus is provided for testing circuit changes during the travel of the dial and for testing open contacts to insure that the voltage required for their breakdown exceeds a predetermined value, and for calibrating the system by delivering impulses which simulate the impulses delivered by a dial which indicates both the speed of operation and the percent break of the contacts, including high frequency circuits arranged to resonate at different frequencies and commutator segments.

The invention can be better understood by reference to the following detailed description taken in connection with the accompanying drawings, in which Figs. 1 and 4, when Fig. 4 is placed to the right of Fig. 1, show the dial testing circuit;

Figs. 2 and 3 are diagrammatic views of dials other than the one included in Fig. 1, which can be tested;

Figs. 5 and 6, when Fig. 6 is placed to the right of Fig. 5, show the circuit of the calibrating instrument and the impulsor;

Figs. 9 and 10 are elevational views of the motor and drive assembly of the impulsor used in the calibrating circuit.

A dial is a device for transmitting a series of electrical impulses and is well known in the art as it is used in connection with automatic telephone circuits for connecting one subscriber's line to another. A dial has a pawl or cam arrangement (not shown) which rotates at a constant speed for making and breaking certain contacts in the dial known as impulse contacts and another pawl or cam (not shown) for opening and closing other contacts known as shunt contacts.

Figures 1, 2, 3:
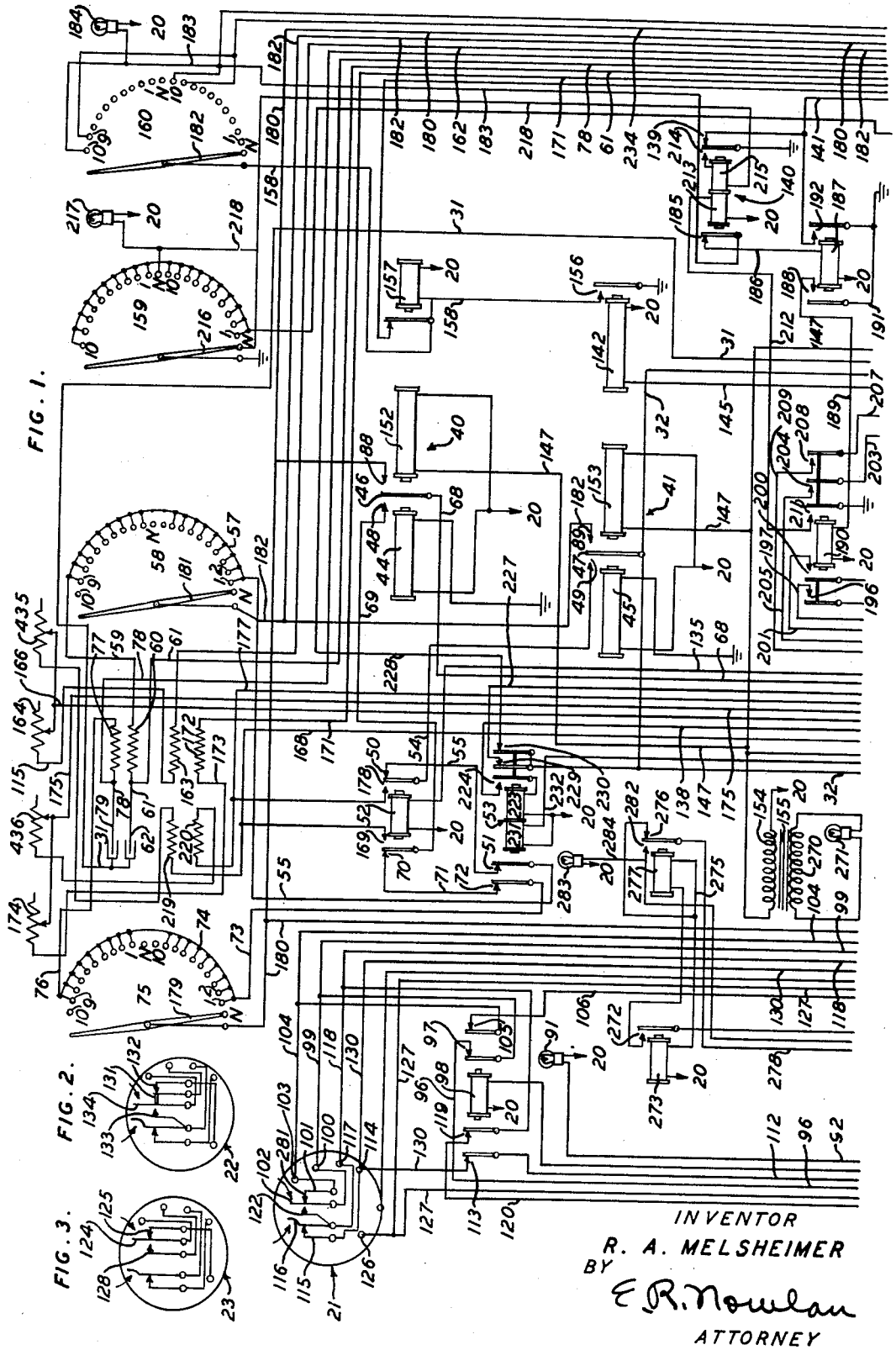
Figure 4:
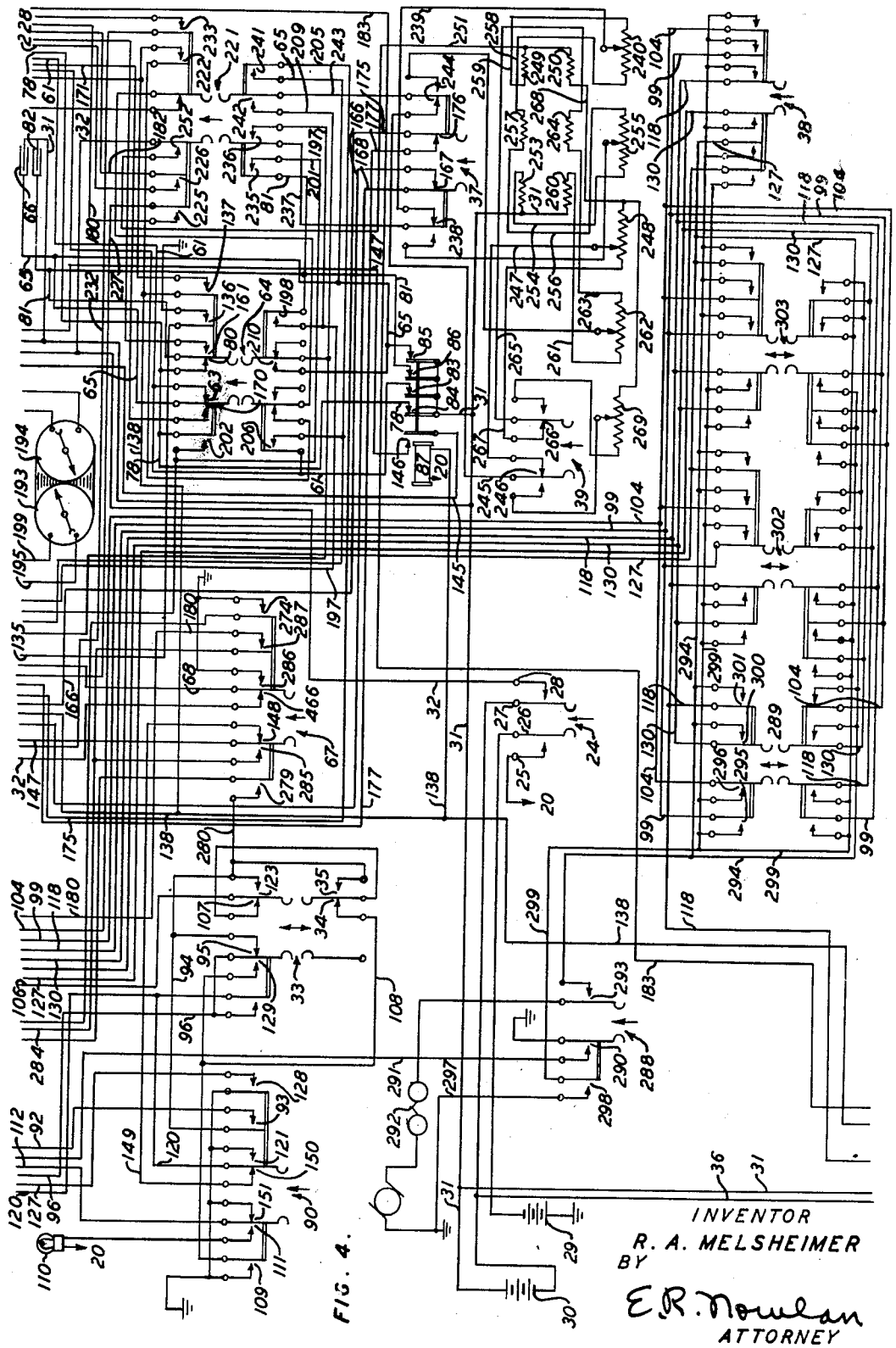

The dial testing circuit shown in Figs. 1 and 4, with Fig. 4 placed to the right of Fig. 1, is capable of testing the dial 21 (Fig. 1) and dials 22 and 23 (Figs. 2 and 3, respectively). This is made possible by the use of switches which are described below.

A switch 24, which controls the power circuits, has two sets of normally open contacts 25, 26 and 27, 28. A source of 48 volt potential 29 has its positive terminal connected to ground and its negative terminal connected to the contact 26. The contact 25 is connected to a conductor 20. For convenience in following the description of the circuit and in tracing the connection on the drawings, the conductor 20 has not been completed to each of the numerous connections, but the end thereof and of each point of a connection thereto has been indicated by an arrow and numeral 20. The contact 27 is connected to the negative side of a source of 90 volt potential 30. The positive terminal of the source of potential 30 is connected to a conductor 31. The contact 28 is connected to a conductor 32.

If the dial 22, shown in Fig. 2, is to be tested instead of the dial 21, shown in Fig. 1, the double throw switch 33 which is shown in its non-operated position is moved to the right to open the contact 34 and close the contact 35. If the dial 23 shown in Fig. 3 is to be tested, the double throw switch 33 is moved to the left to operate the other contact springs shown. When testing the dial 23 (Fig. 3), the switch 37, which is shown in its non-operated position, is operated to make all tests except the breakdown test to the frame of the dial. When breakdown tests are made to the frame of the dial 23 the switch 37 is not operated and the switch 38, which is shown in its non-operated position, is operated. If the dials of the type 21 or 22 are to be tested without disassembling them from other apparatus the switch 39, which is shown in its non-operated position, is operated.

The operation of the switch 24 (with the dial 21 shown in Fig. 1 removed) connects the 48 volt battery 29 to all the relays, resistances and lamps, etc., as shown in Figs. 1 and 4. The minimum relay 40 and maximum relay 41 operate from the battery 29 through the windings 44 and 45 of the relays 40 and 41, respectively, to ground, causing the armatures 46 and 47, respectively, to rest against the contacts 48 and 49, respectively. The negative side of the 90 volt battery 30 is connected through contacts 27 and 28 of the switch 24, conductor 32, armature 47 and contact 49 of the maximum relay 41, conductor 54, normally closed contact 50 of relay 52, conductor 55, normally closed contact 51 of relay 53, conductor 56, the strapping 57 of the selector 58, conductor 59, resistance 60, conductor 61, to the condenser bank 62, and also through conductor 61 to normally closed contacts 63 of the single throw multi-contact switch 64, conductor 65, to the condenser bank 66. The other sides of the condenser banks 62 and 66 are connected through the conductor 31 to the positive side of the 90 volt battery 30. The negative side of the 90 volt battery 30 is connected through the conductor 32, the normally closed contact 466 of switch 67, conductor 68, armature 46 and contact 48 of the minimum relay 40, conductor 69, normally closed contact 70 of relay 52, conductor 71, normally closed contact 72 on relay 53, conductor 73, strapping 74 of the selector 75, conductor 76, resistance 77 and conductor 78 to the condenser bank 79 and also from the conductor 78 to the normally closed contact 80 of switch 64, conductor 81 to the condenser bank 82. The other sides of the condenser banks 62 and 82 are connected to the positive side of the 90 volt battery 30 through the conductor 31. The condenser banks 62, 79, 66 and 82 do not start charging at this time because they are each shunted by a connection from the conductor 31 through the normally closed contacts 83, 84, 85 and 86 of the relay 87 and conductors 61, 78, 65 and 81, respectively.

The connections which are completed when the dial 21 is placed in the dial fixture as shown in Fig. 1 cause the armatures 46 and 47 of the minimum and maximum relays 40 and 41, respectively, to move and contact with the contacts 88 and 89, respectively. The circuits for this operation are described below under the heading "Percent break circuit". The circuits for charging the condenser banks 79, 82, 62 and 66 are then completed. With the dial 21 connected in the dial fixture as shown in Fig. 1, and the switch 24 operated to close the contacts, and the switch 90 moved to the operated position (not shown) all other switches being in their normal positions as shown, the following circuits are completed. One circuit is completed from ground through battery 29, contacts 25 and 26 of switch 24, conductor 20, lamp 91, conductor 92, the normally open contacts 93 of switch 90, conductor 94, the normally closed contact 95 of the switch 33, conductor 96, the normally closed contacts 97 of the relay 98, conductor 99, contact 100 of the dial fixture, normally closed shunt springs 101 and 102 of the dial 21, contact 103 of the dial 21, conductor 104, normally closed contacts 105 of the relay 98, conductor 106, normally closed contacts 107 and 34 of switch 33, conductor 108, and contact 109 of the switch 90, to ground, thereby lighting the lamp 91. Another circuit is completed from ground through the 48 volt battery 29, lamp 110, contact 111 of switch 90, conductor 112, normally closed contacts 113 of relay 98, conductor 130, contact 114 of the dial fixture, through the normally closed impulse springs 115 and 116 of the dial 21, contact 117 on the dial fixture, conductor 118, normally closed contacts 119 of relay 98, conductor 120, and normally open contacts 121 of switch 90, to ground, thereby lighting the lamp 110. When the dial actuating means (not shown) is moved off normal so that the springs 115 and 116 are open, the circuit is broken between the contacts 114 and 117 of the dial fixture and the lamp 91 will be extinguished. When the dial actuating means is moved further off normal, the moving shunt spring 102 will make contact with the upper shunt spring 122, which is connected to the movable pulsing spring 116, and the lamp 91 will relight over the same circuit as before, except that the battery circuit from the lamp 91 passes from the contact 100 on the dial fixture, through the shunt springs 102 and 122 on the dial and then through contact 117 on the dial, conductor 118, contact 119 of the relay 98, conductor 120, contact 121 of the switch 90, to ground.

The circuits for dial 23 (Fig. 3) are similar to those for the dial 21 shown in Fig. 1, except that the switch 33 is operated to actuate the contacts at the left. This completes a circuit from battery 29, through the lamp 91, conductor 92, contacts 93 of switch 90, conductor 94, through the contacts 123 of switch 33, conductor 106, contacts 105 of relay 98, contact 101 on the dial fixture, contacts 124 and 125 of the dial 23, contact 126 on the fixture, conductor 127, contacts 128 on the switch 90, to ground, thereby lighting the lamp 91. The circuit for lighting the lamp 110 is the same as that for the dial 21 (Fig. 1). When the dial actuating means, not shown, is moved off normal, the circuit referred to above for lighting the lamp 91 is broken at the dial contacts 124 and 125 and then closed over the upper shunt springs 124 and 128, completing the circuit over the contact 100 on the fixture, conductor 99, contacts 97 of the relay 98, contacts 129 of the switch 33, and contact 109 of switch 90, to ground.

The circuits for the dial 22 (Fig. 2) are similar to those for the dial 23 (Fig. 3) except that the switch 33 is actuated to the right position, which breaks the contact 34 and makes the contact 35. A circuit is completed from the 48 volt battery 29, through the lamp 91, conductor 92, contact 93 of switch 90, conductor 94, contact 95 of the switch 33, conductor 96, contacts 97 of the relay 98, conductor 99, contact 100 of the dial fixture, contacts 131 and 132 of the dial 22, contact 126 on the dial fixture, conductor 127, contact 128 of switch 90, to ground, thereby lighting the lamp 91. The circuit for lighting the lamp 110 is the same as for the dial 21 (Fig. 1). When the dial actuating means is moved off normal so that the contacts 131 and 132 are broken, the circuit is open between contacts 100 and 126 on the dial fixture and the lamp 91 is extinguished. When the dial actuating means is moved further off normal the springs 133 and 134 of the dial 22 close the circuit for lighting the lamp 91. The circuit is completed from the 48 volt battery 29, through the lamp 91, contact 93 of switch 90, conductor 94, contact 35 of the switch 33, contact 107 of the switch 33, conductor 106, the normally made contact 105 of relay 98, conductor 104, contact 103 on the dial fixture, the shunt dial springs 133 and 134, contact 117 on the dial fixture, conductor 118, the normally closed contacts 119 of the relay 98, conductor 120, and contacts 121 of the switch 90, to ground.

As the circuit for lighting the lamp 110 is the same for any one of the dials 21, 22 or 23, the breaking of the pulse spring contacts of the dials as they return to their normal position will flash the lamp 110.

*Percent break circuits*

The charge placed upon a condenser is proportional to the time of charging and the charging voltage, provided the condenser does not attain the maximum charge possible for the voltage impressed. When the charging voltage is made constant the charge upon a condenser will be directly proportional to the charging time. It has been found desirable to adjust the dials so that the speed at which the contacts are opened and closed and the intervals in which the contacts are alternately opened and closed are between predetermined limits. Condenser banks are employed and are charged through predetermined resistances so that the condenser banks will not attain a maximum charge during the charging period.

In the percent break test four condenser banks are employed, representing maximum and minimum limits, two being charged on the closed portions of the pulse and two on the open portions of the pulse. The charging rates of these condenser banks are controlled by calibrated resistances. The duration of the charge is controlled by the selector which opens the charging circuits at the break of the pulsing springs which follows the ninth closure. The open and closed portions of the pulse are separated by two fast operating relays. An automatic control circuit functions to connect the condenser banks, with polarities opposing, to galvanometers. If the difference in potential between the condenser banks is of such force that the one representing the maximum value is less than the maximum limit and the one representing the minimum value is more than the minimum limit, the two galvanometer needles will move toward each other, indicating that the percent break adjustment of the dial is within the predetermined limits. If the voltage is more than the maximum or less than the minimum, one needle will move away from the other.

The positions of the galvanometer needles are not fixed at zero. The normal position of the needle of the maximum galvanometer is placed about five divisions above the zero, while the normal position of the minimum galvanometer needle is about five positions below the zero. The relation which the needles of these galvanometers indicate is a variable one, the movement of the one needle being complementary to the movement of the other. When the dial is adjusted midway between the upper and lower limits, the needles will move a similar distance toward each other.

When the switch 24 is operated and the dial 21 placed in the fixture as shown in Fig. 1, the multicontact single throw switch 64 is operated. The relay 87 operates over a circuit from battery 29, conductor 20, through the winding of relay 87, conductor 138, through the contacts 137 of switch 64, conductor 141, contacts 139 of relay 140, to ground. The relay 52 operates from the 48 volt battery 29 and conductor 20, through the winding of the relay 52, conductor 135, contacts 136 of switch 64, to ground. The relay 142 operates from the 48 volt battery 29, through conductor 20, the winding of relay 142, conductor 145, through the normally open contacts 146 of the relay 87, conductor 147, contacts 148 of switch 67, conductor 149, contacts 150 of switch 90, conductor 120, contacts 119 of relay 98, conductor 118, contact 117 on the dial fixture, pulsing springs 115 and 116 of the dial 21, contact 114 on the dial fixture, conductor 130, contact 113 of relay 98, conductor 112, contacts 151 of switch 90, to ground. A ground connection from this same source to the conductor 147 holds the minimum and maximum relays 40 and 41, respectively, operated so that their armatures 46 and 47 are held against contacts 88 and 89, respectively, since the windings 152 and 153 of relays 40 and 41, respectively, are connected from the battery 29, through conductor 20 to the conductor 147. A circuit is also closed from the 48 volt battery 29, through conductor 20, primary winding 154 of the transformer 155, conductor 147, to the same ground connection, through the dial contacts described above. These circuits remain the same while the finger wheel of the dial is being turned to the wound position. As the finger wheel is released the dial springs 115 and 116 open. This allows the relay 142 to release and to open the contact 156, which in turn removes the ground connection from the selector magnet 157 by breaking the circuit from the battery 29, conductor 20, selector switch magnet 157, conductor 158, contacts 156, to ground. This moves the selector switches 75, 58, 159 and 160 one step forward, from the normal position shown, to position No. 1. The minimum and maximum relays 40 and 41 release and their armatures 46 and 47 operate to close the contacts 48 and 49, respectively. The condenser 82 starts charging from the positive side of the 90 volt battery 30, through conductor 31, the condenser 82, conductor 81, the contacts 161 of switch 64, conductor 162, resistance 163, conductor 115, rheostat 164, conductor 166, contacts 167 of switch 37, conductor 168, through the normally open contacts 169 of the relay 52, conductor 69, contact 48 and armature 46 of the minimum relay 40, conductor 68, contacts 466 of the switch 67, conductor 32, contacts 27 and 28 of the power switch 24 to the negative side of the 90 volt battery 30. The condenser 66 also starts charging from the positive side of the 90 volt battery 30, through the conductor 31, condenser 66, conductor 65, contact 170 of the switch 64, conductor 171, resistance 176, conductor 173, rheostat 174, conductor 175, contact 176 of the switch 37, conductor 177, contacts 178 on relay 52, conductor 54, contact 49 and armature 47 of the maximum relay 41, conductor 32, contacts 27 and 28 of the power switch 24 to the negative side of the 90 volt battery 30. The charging of the condensers 82 and 66 continues until the dial contact closes at the end of the first break. This reoperates the minimum and maximum relays 40 and 41 to close with contacts 88 and 89, respectively, breaking the charging circuits for the condensers 82 and 66. This also reoperates the relays 142 and reenergizes the selector magnet 157. The condenser banks 79 and 62 now start charging. The condenser bank 79 charges from the positive side of the 90 volt battery 30 through the conductor 31, condenser 79, conductor 78, resistance 77, the strapping 74 of the arc of the selector 75, selector arm 179, conductor 180, contact 88 and armature 46 of relay 40, conductor 68, contact 466 of switch 67, conductor 32, contacts 27 and 28 of the power switch 24 to the negative side of the 90 volt battery 30. The condenser 62 charges from the positive side of the 90 volt battery 30, through conductor 31, condenser 62, resistance 60, the strapping 57 of the selector 58, selector arm 181, conductor 182, contact 89 and armature 47 of relay 41, conductor 32, contacts 27 and 28 of the power switch 24 to the negative side of the 90 volt battery 30. The charging of the condenser banks 79 and 62 continues until the dial contact breaks at the close of the first pulse. The selector arms 179 and 181 move to position No. 2 at the release of the relay 142, and the minimum and maximum relays 40 and 41 release and then operate to close with contacts 48 and 49, respectively, as described above for the first break. This action continues for ten open periods and nine closed periods of the dial contact springs 115 and 116. The selector arms 179 and 181 move one step forward on each break to the next successive position. The condenser banks 82 and 66 and the condenser banks 79 and 62 charge alternately. At the break following the ninth pulse the selector arms 179 and 181 move to the tenth position. This breaks the charging circuits for the condenser banks 79 and 62 as the dial contacts 115 and 116 close on the tenth and final pulse. The maximum and minimum relays 41 and 40 reoperate to contact with contacts 88 and 89, respectively, and the charging circuits for the condenser banks 82 and 66 are thereby broken. The relay 142 is again operated over the circuit described above and energizes the selector magnet 157. It also closes a circuit from ground through its normal open contacts 156, conductor 158, selector arm 182 of selector 160, which is now in the tenth position, conductor 183, test lamp 184, conductor 20, battery 29, thereby lighting the test lamp 184. At this point an automatic control circuit functions to prepare the galvanometer circuits for the test.

*Automatic control circuit*

The ground connected to the test lamp 184 at the end of the condenser charging period is also connected to conductor 183, contacts 185 of relay 140, conductor 186, the winding of relay 187, conductor 20 and to the 48 volt battery 29. This causes the relay 187 to operate and close its contact 188 which, in turn, operates relay 190 through the circuit from battery 29, conductor 20, the winding of relay 190, conductor 189, contact 188 of relay 187 and conductor 191, to ground, and also connects a circuit from ground (in multiple with a similar circuit through the normally closed contacts 185 of the relay 140) through contact 192 of relay 187, conductor 141, and the winding of relay 87 over the circuit referred to above. This places the release of the relay 87 under the control of the relay 187. The operation of the relay 190 connects the condenser banks 79, 62, 82 and 66 to the galvanometers 193 and 194. The positive terminal of the galvanometer 193 is connected through conductor 195, contact 196, conductor 197, contact 198 of the single throw multi-contact switch 64, conductor 81, to condenser 82. The negative terminal of the galvanometer 193 is connected through conductor 199, contact 200 of relay 190, conductor 201, contact 202 of switch 64, and conductor 78, to the condenser 79. The positive terminal of the galvanometer 194 is connected through the conductor 203, contact 204 of relay 190, conductor 205, contact 206 of switch 64, conductor 61, to the condenser 62. The negative terminal of the galvanometer 194 is connected through the conductor 207, contact 208 of relay 190, conductor 209, contact 210 of switch 64, conductor 65 to condenser 66. The operation of the relay 190 also closes a circuit from ground through contact 211 of relay 190, conductor 212, winding 213 of relay 140, conductor 20, to battery 29. The relay 140 operates and locks in the operated position over a local circuit through contact 214 and winding 215. The operation of the relay 140 opens the operating circuits to the relays 87 and 187 by opening contacts 139 and 185, respectively. This causes the relay 187 to restore to its normal position which in turn restores the relay 190 and also breaks the ground circuit to the relay 87. The release of the relay 87 discharges the condenser banks 79, 62, 82 and 66, and also permits the relay 142 to release, which in turn causes the selector magnet 157 to step the selector switch arms 179, 181, 182 and 216 to their normal positions shown, and to light the normal lamp 217 through the circuit from ground, selector switch arm 216, conductor 218, lamp 217, conductor 20, to the 48 volt battery 29. The stepping of the selector from the tenth to the normal position shown also connects a circuit from ground over the arc of the selector 159, conductor 218, to one end of the locking winding 215 of relay 140, thus permitting the relay 140 to release. The release of the relay 140 closes the ground circuit to the relay 87, thereby reenergizing the selector magnet 157 through the relay 142 and the circuit is prepared to receive the next series of ten pulses.

*Percent break circuits—(continued)*

The positive sides of both the condensers 82 and 79 are common through the positive side of the 90 volt battery 30, as described above. The condensers 82 and 79 discharge to a common level and a needle of the galvanometer 193 is deflected an amount proportional to the difference in charge of these two condensers 82 and 79. The resistance 163 is so calibrated that if the percent break adjustment of the dial is on the minimum limit, the charges of the condensers 82 and 79 will be identical in value and there will not be any movement of the galvanometer 193. The galvanometer 193 is so connected that if the charge in the condenser 82 is larger than that in the condenser 79 the needle of galvanometer 193 will move upward, showing that the percent break adjustment of the dial 21 is greater than the minimum requirement. If, however, the charge in the condenser 79 is the larger, the needle of the galvanometer 193 will move downward showing that the adjustment is less than the minimum.

The positive sides of the condensers 66 and 62 are likewise common to the positive side of the 90 volt battery 30, as described above. The condensers 66 and 62 discharge to a common level and the needle of the galvanometer 194 is deflected an amount proportional to the difference in charge between these two condensers 66 and 62. The resistance 172 is so calibrated that if the percent break adjustment of the dial 21 is at the maximum limit the charges of the condensers 66 and 62 will be identical in value and there will be no movement of the galvanometer 194. The galvanometer 194 is so connected that if the charge in the condenser 66 is larger than that in the condenser 62 the needle will move upward showing that the percent break adjustment of the dial 21 is greater than the maximum requirement. If, however, the charge in the condenser 62 is larger, the needle will move downward showing that the adjustment is less than the maximum. Thus, with the dial 21 that is adjusted to a mean value and between the minimum and maximum requirements for percent break, both of the needles of the galvanometers 193 and 194 will move toward each other, and, as the adjustment approaches one limit, the needle representing that limit travels less and the opposite needle will travel more. Also, when the adjustment has exceeded either limit, both needles will move in the same direction.

As the selectors 75, 58, 159 and 160 have twenty-two positions, and the circuit needs but eleven, the selectors have been arranged so that half the positions are used at one test and the other half on the following test. There are two tenth or test positions and two normal or N positions.

The circuits and operations for high speed dials 23 (shown in Fig. 3) are identical to those for low speed dials 21, as described above, except that the switches 37 and 33 are to be operated to the left, as described above, and the charging circuits for the condenser banks 82 and 66 will pass through the resistances 219 and 220, in addition to the resistances 163 and 172, instead of through the contacts 167 and 176 of switch 37.

*Speed circuits*

In the speed test, two condenser banks are charged at different rates, one representing the maximum and the other the minimum speeds. The charging rates of these condensers are controlled by calibrated resistances. The duration of the charge is controlled by the selector which opens the charging circuits at the break of the pulsing springs which follows the ninth closure. An automatic control circuit then connects each condenser bank across a galvanometer at which moment a voltage predetermined by the calibration is impressed in the opposite direction. If the difference in potential between the condenser bank and the applied voltage is of such force that the one representing the maximum value is less than the minimum limit, and the one representing the minimum value is more than the minimum limit, the two galvanometer needles will move toward each other to indicate that the dial is within the predetermined requirements. If the voltage is more than the maximum or less than the minimum one needle will move away.

The operation of the single throw multi-contact switch 221 to the left connects ground to the winding of the relay 87, through contact 222 of switch 221, the circuit being otherwise the same as described above for the percent break test where contact 137 of switch 64 was used to complete the circuit. This same ground connection is also made on the holding winding 223 of the relay 53, through its normally open contact 224, which is connected to conductor 138, but the relay 53 does not operate at this time. The selector magnet 157 being energized as previously described on the operation of the dial 21 functions with the minimum and maximum relays 40 and 41 in the same manner as described above for the percent break test. The condenser banks 79 and 62 are charged in parallel with condenser banks 82 and 66, respectively. The charging period is continuous from the break preceding the first pulse of the selector switches to the break following the ninth pulse. During the break period condenser bank 79 charges from the positive side of the 90 volt battery 30, through conductor 31, condenser bank 79, conductor 78, resistance 77, conductor 76, strapping 74 of the selector arc 75, conductor 73, contact 72 of relay 53, conductor 71, the normally made contact 70 of relay 52, conductor 69, contact 48 and armature 46 of the minimum relay 40, conductor 68, contact 466 of the switch 67, contacts 27 and 28 of the power key 24, to the negative side of the 90 volt battery 30. The condenser bank 82 charges with the condenser bank 79 as the condenser bank 82 is connected across the condenser bank 79, through the circuit including the conductor 81, contact 80 of switch 64, conductor 78 and conductor 31. At the same time the condenser bank 62 charges from the positive side of the 90 volt battery 30, through conductor 31, condenser bank 62, conductor 61, resistance 60, conductor 59, strapping 57 of the selector arc 58, conductor 55, contact 51 of relay 53, to the normally closed contact 50 of relay 52, conductor 54, the contact 49 and armature 47 of the maximum relay 41, conductor 32, and contacts 27 and 28 of the power key 24, to the negative side of the 90 volt battery 30. The condenser bank 66 charges with the condenser bank 62 as the condenser bank 66 is connected across the condenser bank 62, through the circuit including conductor 65, contact 63 of switch 64, conductor 61 and conductor 31.

As the dial contacts 115 and 116 close on the first pulse the minimum and maximum relays 40 and 41 release and operate to close contacts 88 and 89, respectively. The condenser banks 79, 82, 62 and 66 charge as on the open part of the pulse, except that the circuit is connected through the selector arms 181 and 179 of the selectors 58 and 75 and the contacts 88 and 89 of the minimum and maximum relays 40 and 41, to the 90 volt battery 30 instead of through the break contacts 72 and 70 of the relays 53 and 52. Condenser banks 79, 82, 62 and 66 are also charged on a parallel circuit from the positive side of the 90 volt battery 30 through the respective selector banks, resistances and selector arcs and arms as on the closed part of the pulse described above, through the contacts 225 and 226 on the switch 221, conductors 227 and 228, contacts 229 and 230 on the relay 53, conductor 32, and contacts 26 and 27 of the power switch 24, to the negative side of the 90 volt battery 30.

This process continues until the ninth break when the relay 53 operates. The relay 53 operates from the 48 volt battery 20, through conductor 20, winding 231 on relay 53, conductor 232, contacts 233 of switch 221, through the ninth selector terminal of the selector switch 160, selector arm 182, conductor 158, and the normally open contacts 156 of relay 142, to ground. This opens the charging circuits for the condenser banks 79, 82, 62 and 66 during the closed period of the tenth pulse. The condenser banks actually stop charging as the selector arm moves from the ninth to the tenth position at the start of the tenth break. The arrival of the selector in the tenth position operates the relay 190, preparing the galvanometers for the test and illuminating the test lamp 184 as described above in connection with the percent break circuit.

The operation of the relay 190 completes a circuit from the negative side of the minimum galvanometer 193, through the connections described above and contact 235 on switch 221, to the negative sides of condenser banks 79 and 82 and to the positive side of the galvanometer 193, through the circuits described above and the contact 236 on switch 221, conductor 237, contact 238 on switch 37, conductor 239, to the potentiometer connection on the resistance 240. It similarly connects the positive side of the maximum galvanometer 194, through the connections described above and the contact 241 on key 221, to the negative side of condenser banks 62 and 66 and the negative side of galvanometer 194, through the circuits described above and the contacts 242 on switch 221, conductor 243, contact 244 on switch 37, conductor 245, contact 246 on switch 39, conductor 247, to a potentiometer connection on the resistance 248. The key 221 in its operated position completes the two potentiometer circuits by connecting a common side of the resistances 249 and 250 through conductor 251, contacts 252 of switch 221 and conductor 32 to the negative side of the 90 volt battery 30. This, in effect, closes two parallel battery shunt circuits; one from the positive side of the 90 volt battery 30, through the series of connection of resistances 253, conductor 254, resistance 255, conductor 256, resistance 257, conductor 258, resistance 240, conductor 259, resistance 249, through the connections described above, to the negative side of the 90 volt battery 30, and the other circuit, from the positive side of the 90 volt battery 30, through the resistance 260, conductor 261, resistance 262, conductor 263, resistance 264, conductor 265, contact 266 on switch 39, conductor 267, resistance 248, conductor 268, resistance 250 and through the connections described above, to the negative side of the battery 30.

The positive sides of the condenser banks 79, 62, 82 and 66 are connected to the positive side of the 90 volt battery 30, through the conductor 31, which is connected to one side of each of the resistances 253 and 260. The needle deflections of the galvanometers 193 and 194 will therefore indicate a comparison between the charges collected on the condenser banks and the predetermined voltages which are obtained from the potentiometer connections to the battery shunt circuits. The adjustment of the dial speed is interpreted by the direction of the needle deflections in the same manner as described above under the percent break test. The restoration of the switch 221 to its normal position resets the selectors to their normal positions and releases the relay 87, which discharges the condenser banks.

The speed tests for fast dials 23 (Fig. 3) is the same as for dials 21, except that the switch 37 is operated, which transfers the potentiometer connections applying voltages to the minimum and maximum galvanometers 193 and 194, to the resistances 255 and 262, respectively. The speed test for dials mounted on sub-station apparatus is the same as for dials 21 except that the switch 39 is operated, which transfers the potentiometer connection to the maximum galvanometer 194 from the resistance 248, to the resistance 269 and also places the resistance 269 in the battery shunt circuit described above in place of the resistance 248.

*Pawl rebound circuit*

The pawl rebound test makes use of a neon lamp in series with the secondary winding of a transformer. This indicates each closure of the pulsing springs of the dial which opens and closes the primary circuit of the transformer. The 48 volt battery 29 is connected through conductor 20 and the primary winding 154 of the transformer 155 through the pulsing contacts 115 and 116 of the dial 21, to ground, as previously described. Each break of the pulsing springs 115 and 116 interrupts the current flow of this circuit and this in turn induces a flow of current through the secondary winding 270 across which the lamp 271 is connected. The lamp 271 is designed to flash on extremely short pulses and will flicker with each interruption of the dial contacts.

*Click test circuits*

The click test operates over a series circuit through the pulsing and shunt spring contacts of the dial, and several relays, lighting a lamp if the dial meets the required adjustment, which is, that the shunt spring contacts remain closed until after the pulsing spring contacts close.

The operation of the key 67 connects ground to the armature sides of contact 272 of relay 273, through contact 274 of switch 67, and upon the armature 46 of the minimum relay 40, the minimum relay 40 being operated to close the contacts 48 and 49, respectively. A circuit is also completed from the 48 volt battery 29, through the conductor 20, winding of relay 273, conductor 275, normally closed contacts 276 of relay 277, conductor 278, contact 279 of switch 67, conductor 280, contacts 95 of switch 33, conductor 96, normally closed contacts 97 of relay 98, conductor 99, to the contact 100 on the dial fixture. As the dial 21 is moved off normal the shunt springs close and a circuit is completed from ground through contact 151 of switch 90, conductor 112, normally closed contacts 113 of relay 98, contact 114 of the dial fixture, pulsing springs 115 and 116, and shunt springs 102 and 122, contact 100 on the dial fixture, conductor 99, contact 97 of relay 98, conductor 96, contact 95 of switch 33, conductor 280, contact 279 of switch 67, conductor 278, normally closed contacts 276 of relay 277, to the winding of relay 277, and through the winding of relay 273, conductor 20 to battery 29, operating the relay 273. At the same time a circuit is connected from ground, through contacts 274 of switch 67, contacts 272 of relay 273, to the other end of the winding of relay 277, which does not operate at this time. If one pulse is now dialed on the dial 21 the pulse springs 115 and 116 break and the circuit from ground through the pulsing springs 115 and 116 is broken, and ground thereby removed, from the normally closed contacts of the relay 277 and one end of the winding of the relay 277. This causes relay 277 to operate in series with the relay 273.

If the pulsing springs 115 and 116 are adjusted so that they close before the shunt springs 102 and 122 open, a circuit is completed from ground at the switch 90, through conductor 112, normally closed contacts 113 of relay 98, contact 114 of the dial fixture, pulse springs 115 and 116, shunt springs 102 and 122 of the dial 21, contact 100 of the dial fixture, conductor 99, normally closed contact 97 of relay 98, conductor 96, contact 95 of the switch 33, conductor 280, contact 279 of switch 67, conductor 278, normally open contact 282 of relay 277, conductor 284, through the click lamp 283 and conductor 20 to battery 29. Another circuit is completed from the conductor 284, through contact 285 of switch 67, conductor 147, the winding of the minimum relay 40, conductor 20, to battery 29, thereby lighting the click lamp 283 and operating the minimum relay 40. The operation of the minimum relay 40 closes a circuit from ground at the switch 67 through its contacts 286, conductor 68, armature 46, and contact 88 of relay 40, conductor 180, contacts 287 of switch 67, conductor 284, through the click lamp 283 and conductor 20 to battery 29. This latter circuit keeps the lamp 283 lighted after the dial 21 has been returned to normal. The release of the switch 67 restores the circuits to their normal positions by releasing relays 40, 273 and 277. If the shunt contacts 102 and 122 are open when the pulsing contacts 115 and 116 close, the click lamp 283 will not light and the minimum relay 40 will not operate.

The click test for dials 23 (Fig. 3) is the same as for the dial 21, except that switch 33 is operated to the left (opening contacts 95 and 107, etc.) and the circuit which was completed through the contacts 107 of the switch 33 is now completed through the contacts 123 of the switch 33, and through the normally closed contacts 105 of the relay 98 to the contact 103 on the dial fixture instead of to the contact 100 on the dial fixture. The click test for dials 22 (Fig. 2) is the same as described above for the dial 21 except that the switch 33 is operated to the right (opening contact 34 and closing contact 35) and the circuit which was completed through the contact 95 is bridged through the contact 35 to contact 103 on the dial fixture.

Breakdown test

With the switch 24 operated and the dial 21 in the dial fixture, the switches 288 and 289 are operated to set up circuits for testing the insulation between the normally open dial springs 102 and 122. The circuit is completed from ground through the contact 290 of switch 288, conductor 291, winding of relay 98, conductor 20, to battery 29, which operates the relay 288. This disconnects all other test circuits from the dial contacts. One side of the 500 volt breakdown generator is connected through a signal 292, normally open contacts 293 of switch 288, conductor 294, contacts 295 and 296 of switch 289, conductors 104 and 99, contacts 101 and 100 on the dial fixture, to the dial contacts 103 and 102, and the grounded side of the 500 volt generator is connected through conductor 297, contact 298 on key 288, conductor 299, contacts 300 and 301 to switch 289, conductors 130 and 118, the dial fixture contacts 114 and 117, to dial springs 115, 116 and 122. This tests the insulation intervening between the two circuits. In a similar manner, if the dial is held by any convenient means away from its normal position, and the switch 288 is operated, and the switch 289 is operated to the right, the insulation between the normally closed dial contacts 115 and 116, and 102 and 103, is tested. The contacts 102 and 116 are on one side, and the contacts 103 and 115 are on the other side of the 500 volt test circuit.

In testing dials 23 (Fig. 3) the same circuits are employed except that the switch 302 is used with the switch 288. With the switch 302 operated to the left, this arranges the dial fixture contacts 114 and 117 on one side and contacts 100, 101 and 126 on the other side of the testing circuit. When the switch 302 is operated to the right, the contacts 103, 120 and 114 are on one side and the contacts 117 and 126 are on the other side of the testing circuit. In testing dials 22 (Fig. 2) the same circuits are used except that the switch 303 is used with switch 288. When the switch 303 is operated to the left the dial contacts 114 and 117 are connected to one side and the contacts 101, 100 and 126 are connected to the other side of the testing circuit. When the switch 303 is operated to the right the contacts 101, 100 and 117 are connected to one side and contacts 114 and 126 to the other side of the testing circuit. The operation of the switch 38, with the switch 288 also operated, connects all of the dial fixture contacts 103, 100, 117, 114 and 126 to one side of the 500 volt circuit, and the frame of the dial to the other side. This circuit tests the insulation between the contact spring assembly and the frame of the dial. The return of the switch 288 to its normal position allows the relay 98 to release and return to its normal position, and also disconnects both sides of the 500 volt test circuit.

Impulse calibrating instrument

Figure 5:
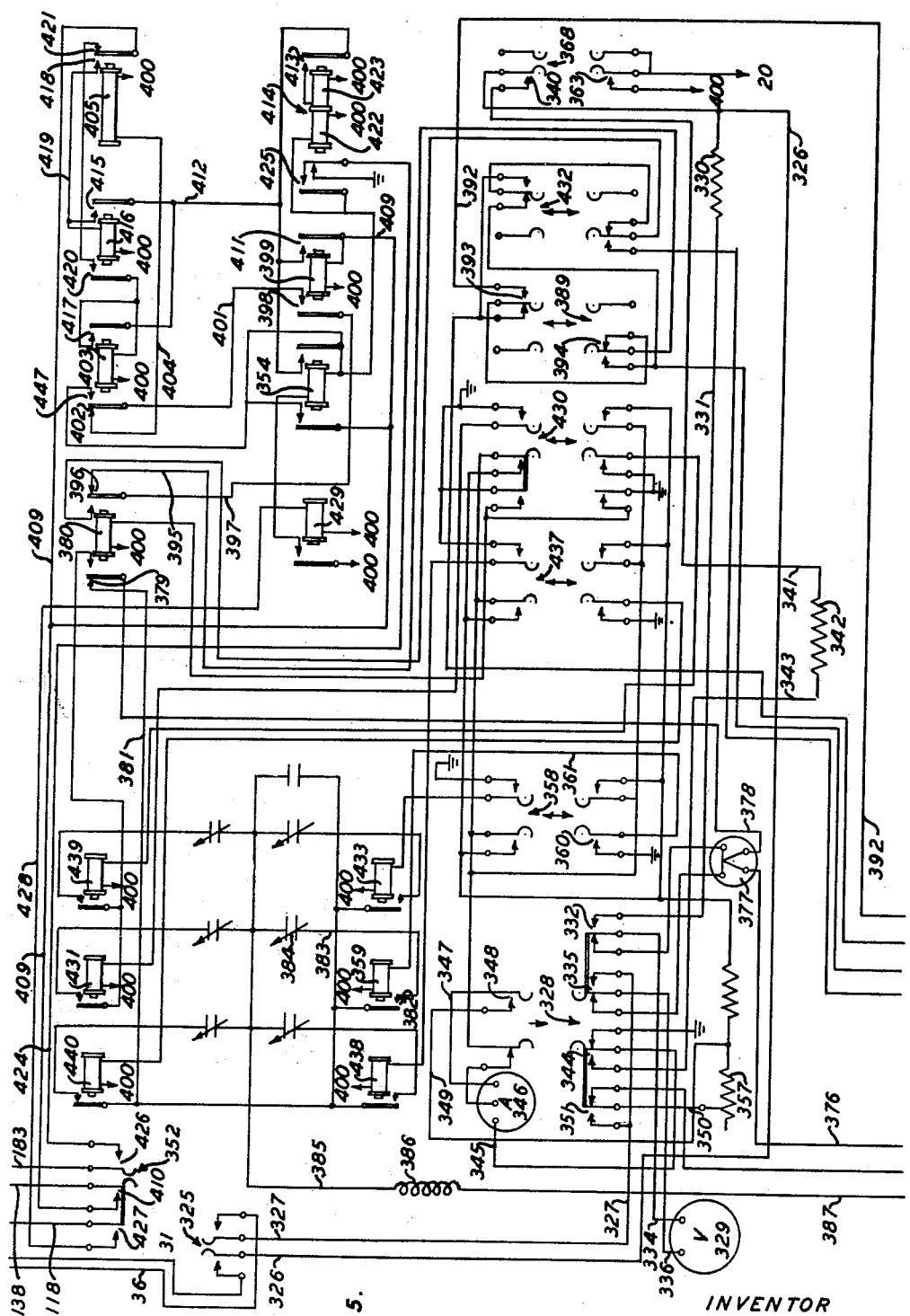
Figure 6:
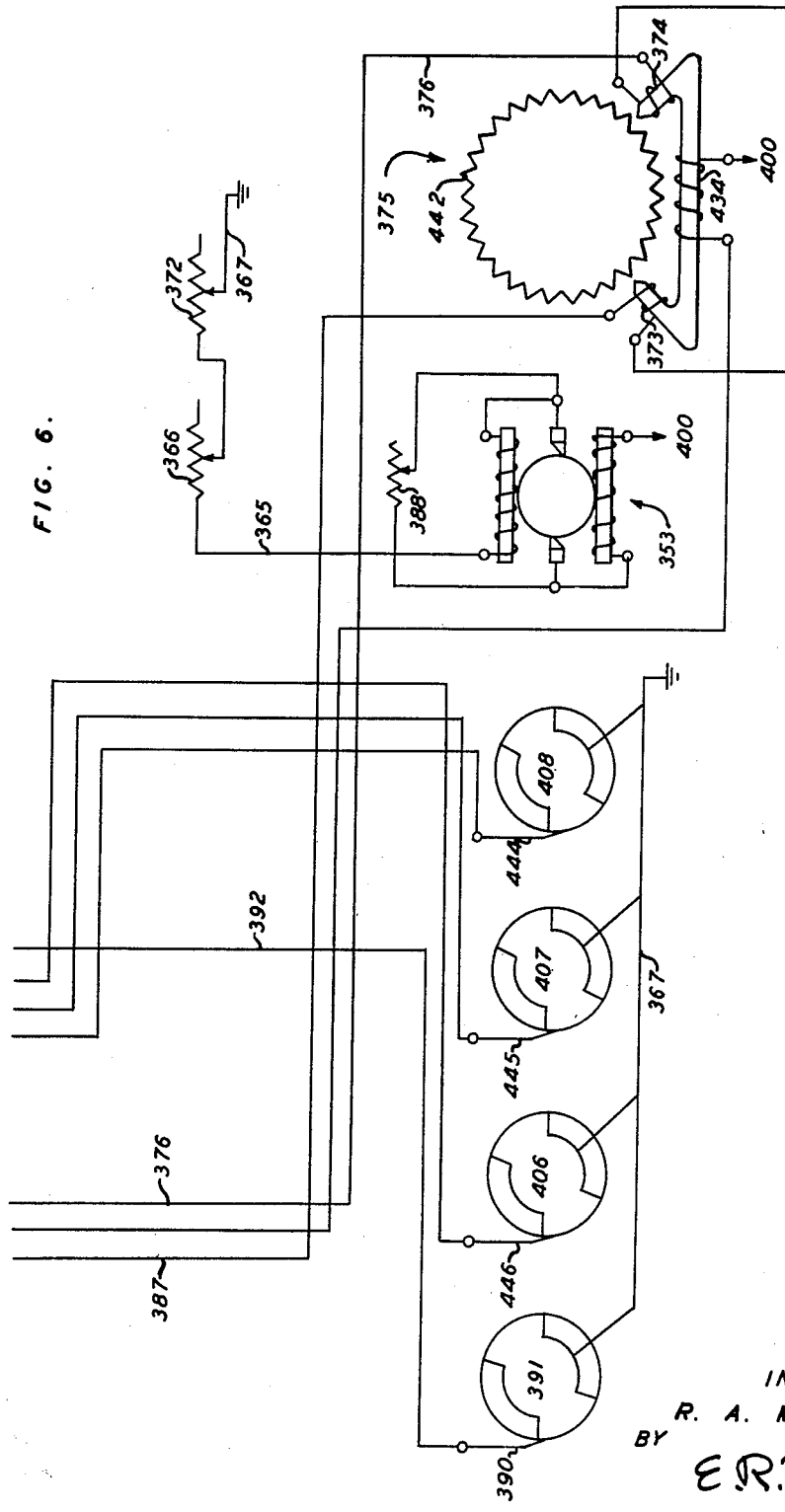
Figure 7:
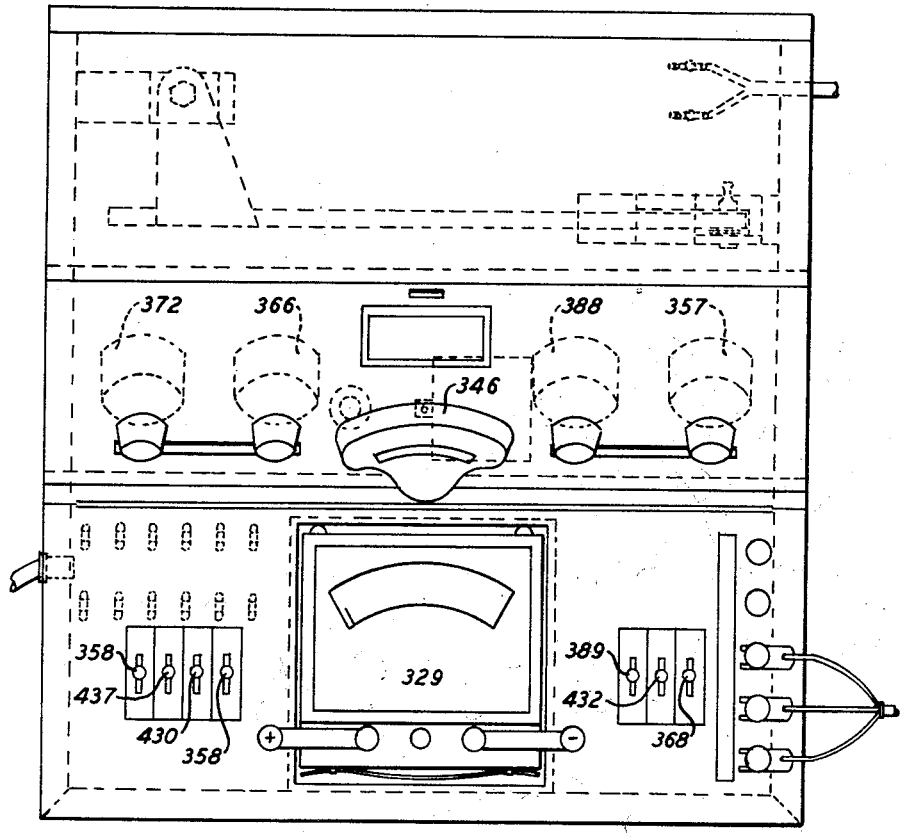
Fig. 7 is a plan view of the calibrating instrument or impulse standard.
Figure 8:
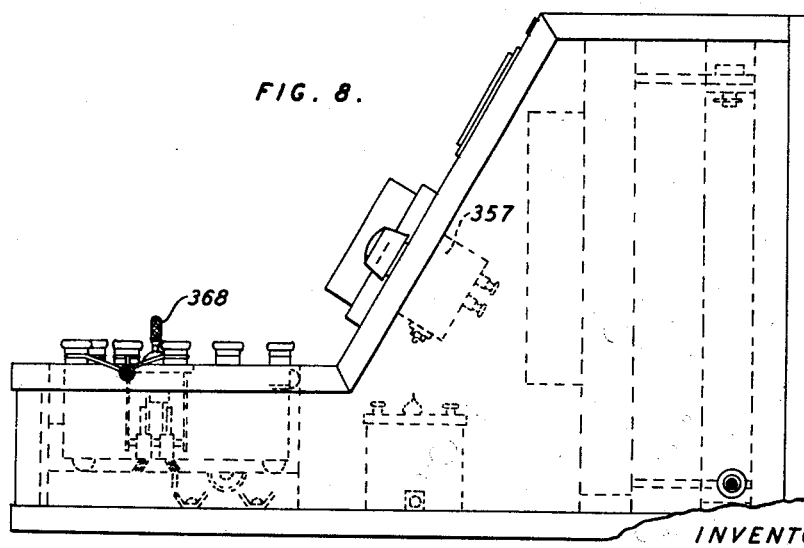
Fig. 8 is a side elevational view of the calibrating instrument or impulse standard.

The calibrating instrument which comprises an impulse standard (Fig. 5) when used in conjunction with an impulsor (Fig. 6) provides facilities for checking and adjusting the dial testing set described above. The calibrating instrument is connected to the dial test set as shown, when Fig. 5 is placed to the right of Fig. 4 and Fig. 6 is placed to the right of Fig. 5.

The impulsor shown in Figs. 9 and 10 comprises a small high speed motor 353 with a slow geared shaft 441 connected thereto, and a high frequency generator 375, the rotor 442 of which is directly coupled to the armature shaft of motor 353. The high frequency generator 375 has a pair of field coils 373 and 374 and an exciting coil 439. The commutator 443 has four segments coupled to the slow speed shaft 441. Each of the four commutator segments has two conducting segments 408, 407, 406 and 391, respectively. Brushes 444, 445, 446 and 390 are associated with the conducting segments 408, 407, 406 and 391, respectively.

The impulse standard (Fig. 5) is so arranged that the output of the high frequency generator 375 is coupled through one of several tuned circuits to a thermo-couple 377. The thermo-couple 377 is connected to the meter 329 through contacts on switch 328. One of the tuned output circuits comprises an inductance 386 and a variable condenser 384. The speed of the motor 353 will then be indicated as variations from a predetermined frequency band. The maximum current flow through the thermo-couple 377, as indicated on the meter 329, will indicate that the frequency of the output of the generator 375 is at the midpoint of the resonant curve for the speed desired. As the direct current resistance of these circuits has been kept comparatively low, the steepness of the resonant curve will permit setting and maintaining the speed of the motor 353 to approximately one revolution in 2000. In a particular unit assembled and tested, this is equivalent to a needle movement on the meter 329 of two scale divisions and to an impulse accuracy of less than five one-hundredths of a pulse.

As the dial 21 produces a train of ten pulses, starting from a closed circuit condition and ending with a closed circuit condition, it is necessary that the impulse standard function in the same manner. Accordingly, the circuit is held closed over relay circuits described below until a closed section of one of the commutators 391, 406, 407 and 408 has passed beneath its associated contact brush 390, 446, 445 and 444, respectively. The break in the circuit following this pulse is not delivered to the dial test set, but prepares the relay circuit, as described below, to connect the next impulse from the commutators, through the dial test set. In this manner only full pulses and complete trains of pulses are permitted to be delivered to the dial test set.

The single throw multi-contact switch 325 is operated to connect the positive and negative terminals of the 90 volt battery 30 to the conductors 326 and 327, respectively. The multicontact switch 328 is operated and the no load value of the 90 volt battery is read on the millivoltmeter 329. The meter 329 is connected to the conductor 326, through the conductor 334, contact 332 of switch 328, conductor 331, and resistance 330. The meter 329 is connected to the conductor 327, through conductor 336 and contact 335 of the switch 328. The switch 368 is operated to the left position. This connection closes a circuit from the conductor 326, through contact 340 of switch 368, conductor 341, load resistance 342, conductor 343, contact 344 of switch 328, conductor 345, milliammeter 346, conductor 347, contact 348 of switch 328, conductor 349, rheostat 357, conductor 350 and contact 351, to conductor 327. The load value of the 90 volt battery is read on the millivoltmeter 329. The reading of the milliammeter 346 is noted when the switch 368 is operated to the left or load position. The internal resistance of the 90 volt battery 30 is calculated and the battery is replaced by a new one if its internal resistance exceeds a predetermined amount.

The switch 325 is opened to disconnect the conductors 31 and 326, and 32 and 327, and the switch 352 is operated. The rheostat 372 is set to its maximum resistance value and the switch 368 is operated to the right or power position. This closes the contact 363 on switch 368 and connects the negative side of battery 29 through conductor 20, contact 363, to conductor 400. The conductor 400 is connected to each of the relay windings, except the winding of the relay 354, and to one side of the motor 353 (Fig. 6), and to simplify the drawing, this connection to each of the relays, etc., has not been completed but has been indicated by an arrow and the numeral 400. Since the motor 353 (Fig. 6) is connected to battery over the circuit described above on one side and on the other side through conductor 365, rheostats 366 and 372, conductor 367, to ground, the closing of contact 363 starts the motor.

*Percent break check*

The percent break check for low speed dials is made by operating the switch 358 to the right or 9.5 position. This operates the relay 359 over the circuit from ground and the positive side of the 48 volt battery 29, through contact 360 of switch 358, conductor 361, winding of relay 359 and conductor 400, to the negative side of the 48 volt battery 29, over the remainder of the circuit, as described above. The operation of the relay 359 places the second channel in operation by closing a circuit through the field coils 373 and 374 of the high frequency generator 375, conductor 376, thermo-couple 377, conductor 378, contact 379 of relay 380, conductor 381, contact 382 of relay 359, conductor 383, condenser 384, conductor 385, inductance 386, conductor 387, to the field coil 373. The current through the field coil 434 of the generator 375 is adjusted to a predetermined value to provide a maximum needle deflection on the millivoltmeter 329. The speed of the motor 353, to which the high frequency generator 375 is coupled is adjusted by varying the current by means of the rheostats 366 and 372. Fine adjustment of the speed of the motor 353 is obtained by adjusting rheostat 388 until a maximum reading is obtained on the millivoltmeter 329. The switch 389 is operated to the left or minimum position, which closes a circuit from brush 390 of the commutator segment 391, through the conductor 392, contacts 393 and 394 of switch 389, conductor 395, contact 396 of relay 380, conductor 397, to one side of the open contact 393 of relay 399. The other side of the open contact 398 of relay 399 is connected through conductor 401, contact 402 on relay 403, conductor 404, winding of relay 405, to conductor 400, which is connected to the negative side of the battery 29, through the circuit, as described above. Each of the commutators 391, 406, 407 and 408 is connected through the conductor 367 to ground. The dial test set shown in Figs. 1 and 4 is now in a condition which is similar to the condition when the dial 21 is placed in the holding fixture. The switch 64 (Fig. 4) of the dial test set is moved to the operated position. This closes the circuit previously described, through contact 137 and conductor 138, and as the winding of relay 399 is connected through conductor 409 and contact 410 of switch 352, the relay 399 operates to close its normally open contacts 398 and 411. The operation of the relay 399 connects the circuit from ground, described above, through contact 411 on relay 399, conductor 412, to the normally open contacts 413 of the relay 414, contact 415 of relay 416, and contact 417 of relay 403. Pulses at the rate of 9.5 P. P. S. are being sent from the 61% break segment 391 of the commutator, through the normally closed contacts 394 of the switch 389, the normally closed contacts 396 of the relay 380, the normally open contact 398 of relay 399, the normally closed contact 402 of relay 403, to one side of the winding of relay 405, causing the relay 405 to operate intermittently in step with the ground pulses received from the commutator 391. With the operation of the relay 405, the ground connection through the conductor 183, contact 410 of switch 352, and conductor 409 is connected through the normally open contacts 418 of the relay 405 and conductor 419, to one side of the winding of relay 416, causing the relay 416 to operate. The relay 416 remains operated over a circuit from ground, through its normally open contact 415, and through the normally open contact 411 of relay 399. The relay 403 is now operated over the circuit from ground, through the normally open contact 420 of relay 416, and the normally closed contact 421 of relay 405. The relay 403 remains operated over the circuit from ground, through its normally open contact 417, and through the normally open contact of relay 399. With the operation of the relay 403, the pulses received from the commutator 391 through the normally closed contacts 402 of the relay 403 are transferred to the normally open contacts 447 of the relay 403, and through the winding 422 of relay 414, causing relay 414 to operate. The relay 414 remains operated over the circuit from ground, through its normally open contact 413, conductor 412, normally open contact 411 of relay 399, to the winding 423. With the operation of relay 414 the pulses continue onto the conductor 424 of the impulse standard (Fig. 5) passing through the normally open contact 425 of relay 414. These pulses operate the relay 142 in the dial test set over the conductor 424, contact 426 of switch 352, conductor 138, and the circuit described above, causing the selector to operate. When the tenth break occurs, ground from the ninth position of the selector 160 is placed on the conductor 118, over the circuit described above, and through contact 427, switch 352, conductor 428 of the impulse standard which operates relay 429, and the relay 429 operates when the tenth make is made. The releasing of the switch 64 returns the selector arms 179, 181, 216 and 182 of the selectors 75, 58, 159 and 160 to their normal positions, and removes the ground connection from the conductor 409. The return of the selector arms to their normal positions releases the relay 87 and removes the ground connection from the conductor 428. The removal of the ground connection from the conductor 409 removes the ground connection from relays 399, 414, 403 and 416, but they do not release until the holding circuit of the relays 429 and 354 is opened by the removal of ground connection from the conductor 428. At this time the relays 429, 354, 399, 414, 403 and 416 release and the circuit is prepared for the next operation.

Similar circuit action occurs when the switches are arranged for maximum percent break, low speed dials 21 and for minimum and maximum percent break high speed dials 23 (Fig. 3), except that the pulses come through from the "66", "63.5" and "63.5" segments 407, 406 and 408 of the commutator, respectively. In a similar manner in the speed calibration the action is the same except that "63.5" and the "66" segments 406 and 407 of the commutator are used, respectively, for the slow and fast speed dials.

The action of the dial test set described above is the same as that when a dial is placed in the dial fixture during the regular testing operation. The normal lamp 217 is extinguished and after about a second the test lamp 184 is lighted, indicating that the condensers are charged and that the circuit is prepared for the next step. The automatic control circuit described above functions and the movement of the galvanometer needles is noted. The needle of the minimum galvanometer 193 should remain fixed and the needle of the maximum galvanometer 194 should move downward. This specific action of the galvanometers 193 and 194 is obtained by adjusting the potentiometer 164. The switch 64 of the dial test set is then returned to its normal position.

The switch 389 is operated to the right or maximum position. The switch 64 is then moved to the operated position. The same action takes place and the same conditions are established as for the minimum percent break calibration as described above except that the maximum limits are used. After ten pulses are delivered the normal lamp 217 will be extinguished and the test lamp 184 will be lighted. The automatic control circuit described above will function and the movement of the needles of the galvanometers 193 and 194 noted. The needle of the maximum galvanometer 194 should remain fixed and the needle of the minimum galvanometer 193 should move up. This specific action of the maximum galvanometer 194 is obtained by adjusting the potentiometer 174. The switch 64 of the dial test set and the switches 358 and 389 of the impulse standard are then returned to their normal positions.

To calibrate the test set for high speed dials 23 (Fig. 3), the switch 430 is operated to the left or "17.3" position. This causes relays 431 and 380 to operate and places the fifth channel in operation. The speed of the motor 353 is adjusted to its proper value in the same manner as described above for calibrating the set for low speed dials 21, except that a different predetermined reference value is employed. The switch 432 is operated to the left or minimum position and the switches 37 and 64 are operated. After ten pulses are delivered the normal lamp 217 will be extinguished and the test lamp 184 will be lighted. The automatic control circuit described above will function and the movement of the needles of the galvanometers 193 and 194 will be noted. The needle of the minimum galvanometer 193 should remain fixed and the needle of the maximum galvanometer 194 should move downward. This specific action of the minimum galvanometer is obtained by adjusting the potentiometer 435 (Fig. 1). The switch 64 is moved to its normal position, the switch 432 moved to the right or maximum position and the switch 64 then moved to the operated position. After ten pulses are delivered, which will be indicated by the extinguishing of the normal lamp 217 and the lighting of the test lamp 184, the automatic control circuit described above will function and the movement of the needles of galvanometers 193 and 194 is noted. The needle of the maximum galvanometer 194 should remain fixed and the needle of the minimum galvanometer 193 should move upward. The specific action of the maximum galvanometer 194 is obtained by adjusting the potentiometer 436. The switches 37 and 64 of the dial test set are returned to their normal positions and the switches 430 and 432 of the impulse standard are returned to their normal positions.

*Speed test check*

The speed test check on low speed dials 21 is made by operating the switch 358 to the left or "8.7" position which operates relay 433, placing the first channel in operation. The speed of the motor 353 is adjusted to its proper value in the same manner as in the percent break test, except that a different predetermined reference value is employed. The switch 221 of the dial test set is operated and the same action takes place and the same conditions are established as for the minimum percent break check on dials 21, except that the pulses are delivered from the "63.5" break segments 406 of the commutator at the rate of 8.7 pulses per second. The automatic control circuit described above will function and the movement of the galvanometer needles 193 and 194 are noted. The needle of the minimum galvanometer 193 should remain fixed and the needle of the maximum galvanometer 194 should move downward. This specific action of the minimum galvanometer 193 is obtained by adjusting the potentiometer 240. The switch 221 of the dial test set and switch 358 of the impulse standard are then returned to their normal positions. The switch 437 is operated to the left or "10.1" position, which operates relay 438, placing the third channel in operation. The speed of the motor 353 is adjusted to its proper value using another predetermined reference value. The switch 221 of the dial test set is then operated and the same action takes place as described above, pulses being delivered at the rate of 10.1 pulses per second. The automatic control circuit described above will function and the movement of the needles of galvanometers 193 and 194 noted. The needle of the maximum galvanometer 194 should remain fixed and the needle of the minimum galvanometer 193 should move upward. This specific action of the maximum galvanometer 194 is obtained by adjusting the potentiometer 248. The switch 221 of the dial test set and the switch 437 of the impulse standard are returned to their normal positions.

The speed test check on high speed dials is made by first operating the switch 430 to the left or "17.3" position which operates relays 431 and 380, placing the fifth channel in operation. The circuit functions in a manner similar to that described above for low speed dials 21.

The potentiometer 255 is adjusted to cause the needle of the minimum galvanometer 193 to remain fixed. The switch 430 is operated to the right or 13.8 position, which causes relays 439 and 380 to operate and places the sixth channel in operation. The circuit functions in the same manner as described above, except that pulses are delivered at the rate of 18.8 pulses per second and the potentiometer 262 is adjusted to cause the maximum galvanometer 194 to remain fixed.

The fourth channel is provided to insure that the circuit is adjusted so that the maximum galvanometer 194 will remain fixed when pulses are delivered from the commutator 406 at the rate of 10.3 pulses per second. This is accomplished by operating the switch 437 to the right or "10.3" position, which operates relay 440. The potentiometer 269 is adjusted so that the needle of the maximum galvanometer 194 does not move during the circuit operation.

While one embodiment of the invention has been shown and described in detail, it is to be understood that the invention is generic in character and is not to be construed as limited to the particular embodiment since numerous modifications thereof may be made by persons skilled in the art without departing from the spirit of applicant's invention, the scope of which is to be determined by the appended claims.

What is claimed is:

1. In a system for testing an interrupting device, a selector switch for following the interruptions, a testing circuit including a plurality of condensers, means for charging one of the condensers during electrical impulses, means for charging another of the condensers during intervals between impulses, and means including the selector switch responsive to the condenser charges for indicating the relative duration of the impulses and intervals.

2. In a testing apparatus, a testing circuit including a plurality of condensers, means for charging one of the condensers during impulses, means for charging another of the condensers during intervals between impulses, a plurality of relays one of which is actuated in response to each impulse, a selector switch actuated in response to each impulse for interrupting the charging of the condensers at the end of a predetermined number of pulses, and means responsive to the charges on the condensers for indicating the ratio between impulses and intervals.

3. In a system for testing the relation of impulses to intervals produced by an interrupting device, a testing circuit including a pair of condensers, a source of energy, a relay for connecting the source of energy to one of the condensers during an impulse and to the other condenser during an interval, means for indicating the difference between the electrical charges of the condensers, and means for automatically momentarily connecting said condensers to said response means and for discharging said condensers.

4. In a system for testing the relation of impulses to intervals produced by an interrupting device, a testing circuit including a pair of condensers, a resistance in series with each of the condensers, said resistances having such a relative value that the charges on the condensers will be equal upon a predetermined relation of impulses to intervals, a source of energy, a relay for connecting the source of energy to one of the condensers through one of said resistances during an impulse and to the second condenser through the other resistance during an interval, means for indicating the difference between the electrical charges of the condensers, and means for automatically connecting said condensers to said response means and for discharging said condensers.

5. In an apparatus for determining the frequency of impulses, a testing circuit including a condenser for receiving a charge during impulses, a condenser for receiving a charge during intervals between impulses, a plurality of relays one of which is actuated in response to each impulse, means including a selector switch actuated in response to each impulse for interrupting the charging of the condensers, means for automatically preparing an indicating circuit upon the conclusion of the condenser charging periods, and means in the indicating circuit responsive to the charges on the condensers for indicating the frequency of the impulses.

6. In a testing apparatus, a testing circuit including a plurality of condensers, means for charging one of the condensers during impulses, means for charging another of the condensers during intervals between impulses, a selector switch actuated in response to each impulse for interrupting the charging of the condensers, a plurality of relays one of which is actuated in response to each impulse, means responsive to the charges on the condensers for indicating the ratio between impulses and intervals, and means for momentarily connecting said condensers to said response means and for stepping said selector switch to its normal position.

7. In a testing apparatus, a testing circuit including a condenser adapted to be charged during an impulse, a second condenser adapted to be charged during an interval between impulses, a source of energy for charging said condensers, means for connecting said source to the first condenser during an impulse and to the second condenser during an interval between impulses, and means for indicating the difference between the electrical charges of the condensers, said last mentioned means including a relay to momentarily connect said condensers to an indicating instrument and for subsequently discharging said condensers.

8. In a testing apparatus, a testing circuit including a condenser adapted to be charged during an impulse, a second condenser adapted to be charged during an interval between impulses, a source of energy for charging the condensers, means for connecting said source first to the one condenser and then to the other, and a selector switch for following the impulses to be measured and for disconnecting said source of energy from one of said condensers after a predetermined number of impulses.

9. In a system for calibrating a circuit for testing the relation of impulses to intervals produced by an interrupting device, the testing circuit including a pair of condensers, a resistance in series with each of the condensers, said resistances being adjustable to a relative value such that the charges on the condensers are equal upon a predetermined relation of impulses to intervals, a source of energy, a relay for connecting the source of energy to one of the condensers through one of said resistances during an impulse and to the second condenser through the other resistance during an interval, and means for indicating the difference between the electrical charges of the condensers, a commutator rotating at constant speed for producing the impulses and intervals, and a plurality of relays to transmit full impulses and complete trains of impulses to the test circuit and to prevent partial impulses and partial trains of impulses from being transmitted to the test circuit.

10. In a system for calibrating a circuit for testing an interrupting device which delivers a train of impulses starting from a closed circuit position and ending in a closed circuit condition, the testing circuit including a plurality of condensers, means for charging one of the condensers during the electrical impulses, means for charging another of the condensers during intervals between the impulses, and means responsive to the condenser charges for indicating the relative duration of the impulses and intervals, a rotating commutator for producing the impulses, an alternating current generator and a tuned circuit coupled thereto for indicating the speed of the commutator, and means to transmit full impulses and complete trains of impulses from the rotating commutator to the condensers and to prevent the transmission of partial impulses and partial trains of impulses to the test circuit.

11. In a system for calibrating a circuit for determining the frequency of impulses caused by an interrupting device which delivers a train of impulses starting from a closed circuit position and ending in a closed circuit condition, the testing circuit including a condenser adapted to be charged during an impulse period, a potentiometer for establishing a comparative voltage, and means for comparing the potentiometer voltage with the charge on the condenser to determine the frequency of the impulses, a rotating commutator for producing the impulses, and means to prevent partial impulses and partial trains of impulses from being delivered to said condenser.

12. In a calibrating apparatus for a testing circuit for determining the characteristics of an interrupting device which delivers a train of impulses starting from a closed circuit position and ending in a closed circuit condition, the testing circuit including a condenser adapted to be charged during an impulse, and a second condenser adapted to be charged during an interval between impulses, a rotating commutator, a source of energy for charging said condensers, means for connecting said source to the first condenser during an impulse and to the second condenser during an interval between impulses, means for indicating the difference between the electrical charges of the condensers, and means for preventing the transmission of partial impulses and partial trains of impulses to said condenser.

13. In a system for calibrating a circuit for testing the relation of impulses to intervals produced by an interrupting device which delivers a train of impulses starting from a closed circuit position and ending in a closed circuit position, the testing circuit including a pair of condensers, a source of energy, a relay for connecting the source of energy to one of the condensers during an impulse and to the other condenser during an interval, means for indicating the difference between the electrical charges of the condensers, and means for producing impulses of predetermined length and at a predetermined rate, and means to prevent partial impulses and partial trains of impulses from being transmitted to the testing circuit.

ROBERT A. MELSHEIMER.